E. F. MILLER.
SIGNAL RECORDER FOR LOCOMOTIVES.
APPLICATION FILED DEC. 31, 1915.
1,259,429.
Patented Mar. 12, 1918.
3 SHEETS—SHEET 1.
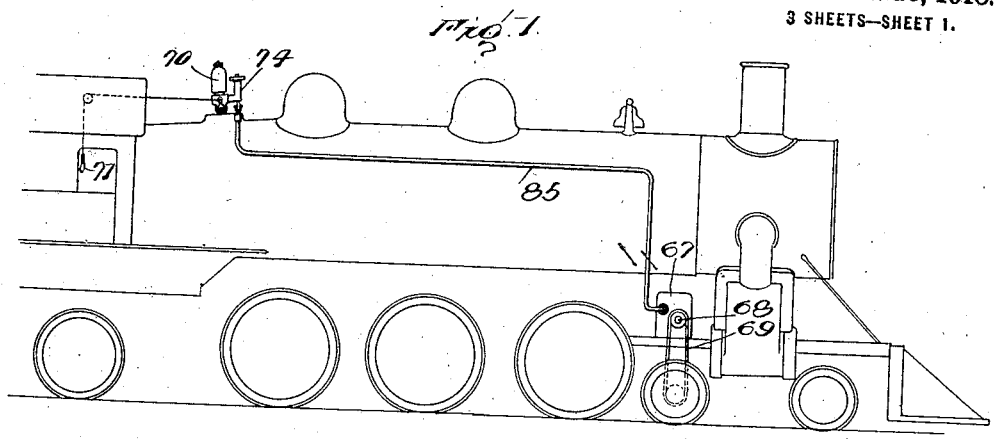
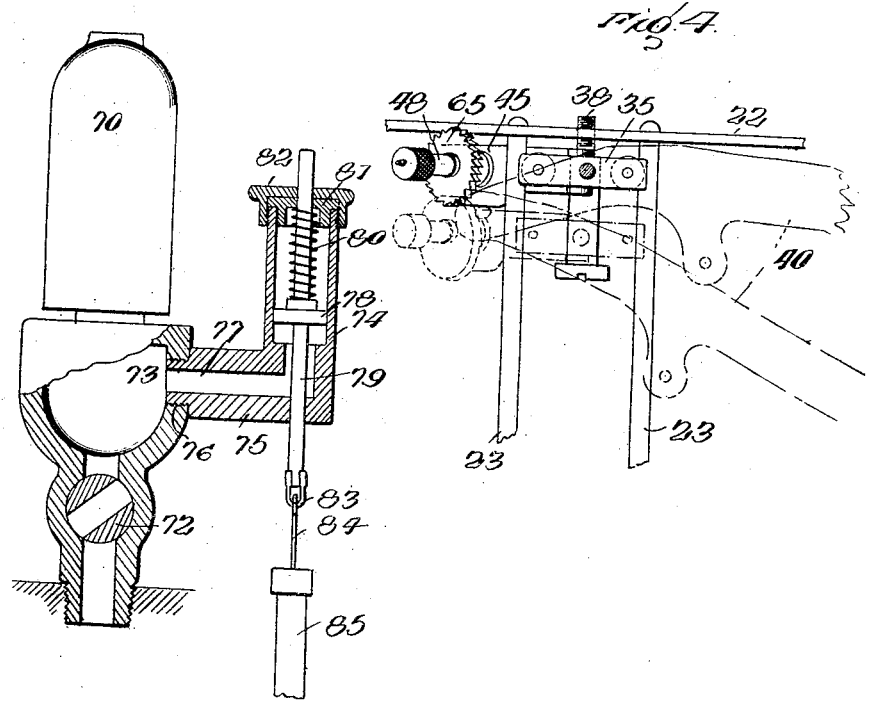
Inventor
E. F. Miller
By
Barnsacey, Attorneys

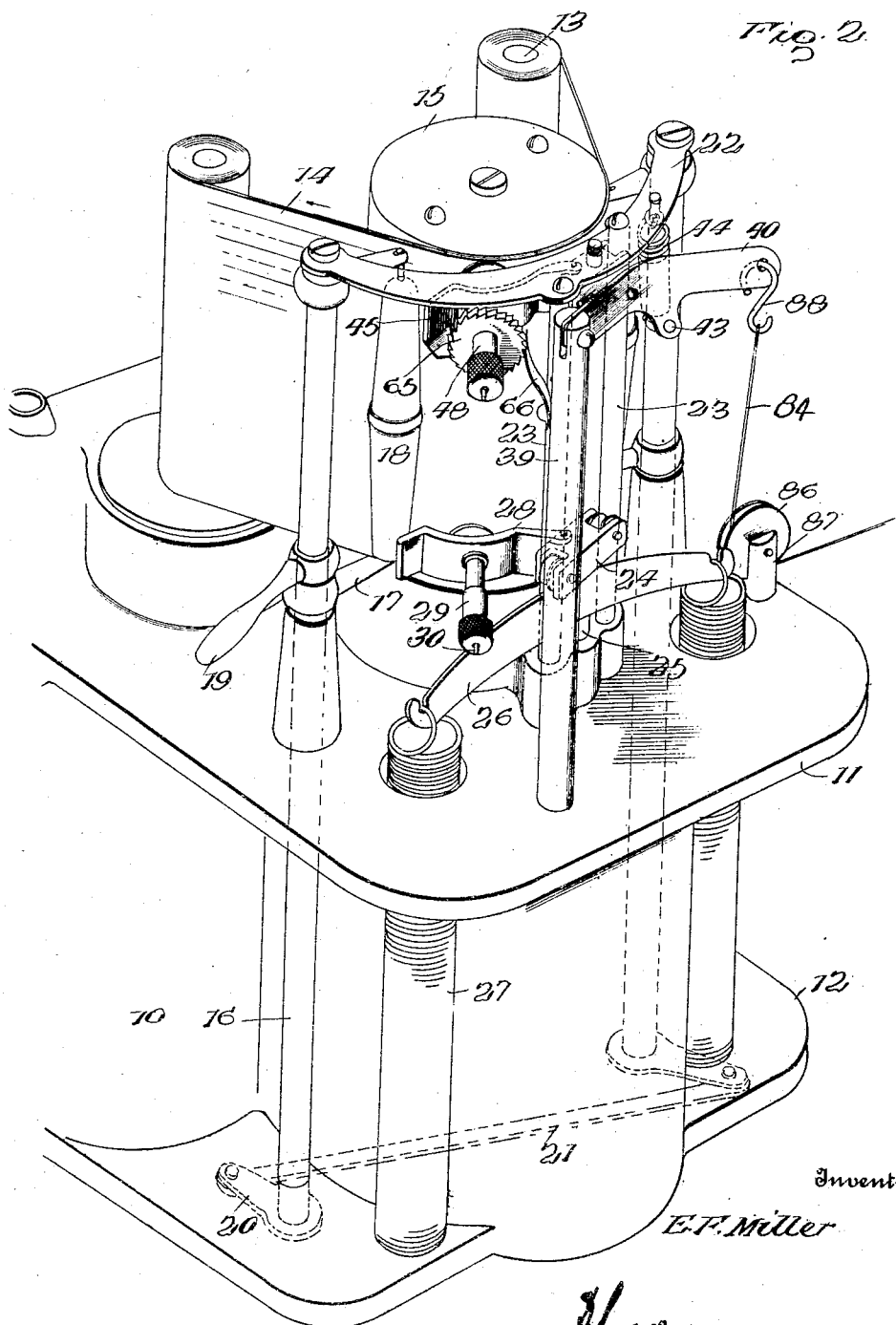

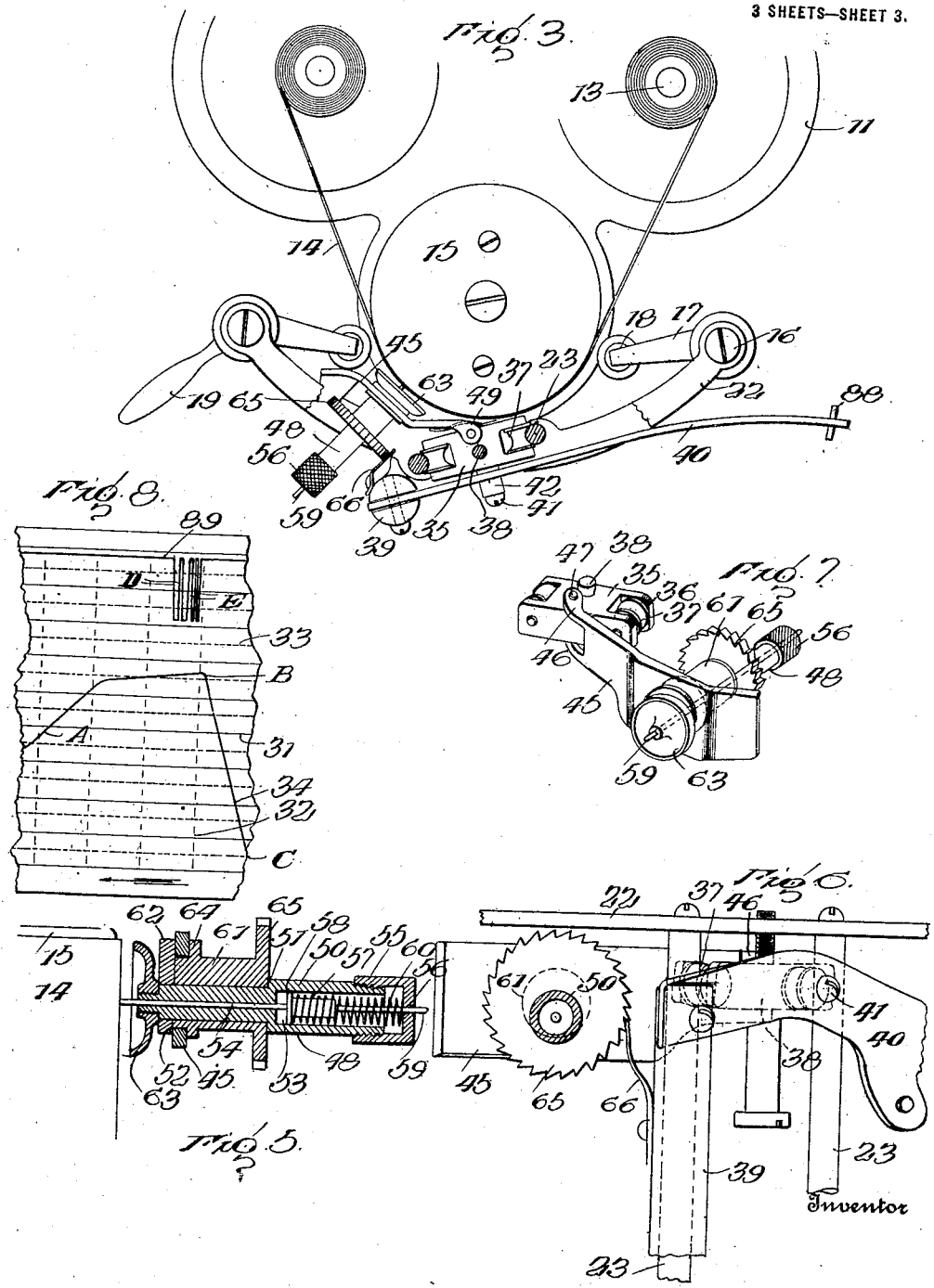

UNITED STATES PATENT OFFICE.

EDWIN F. MILLER, OF RALEIGH, NORTH CAROLINA, ASSIGNOR OF ONE-FOURTH TO ROBERT M. BYNUM, OF RALEIGH, NORTH CAROLINA.

SIGNAL-RECORDER FOR LOCOMOTIVES.

1,259,429.   Specification of Letters Patent.   Patented Mar. 12, 1918.

Application filed December 31, 1915. Serial No. 69,593.

*To all whom it may concern:*

Be it known that I, EDWIN F. MILLER, a citizen of the United States, residing at Raleigh, in the county of Wake and State of North Carolina, have invented certain new and useful Improvements in Signal-Recorders for Locomotives, of which the following is a specification.

My invention relates to new and useful improvements in recording mechanisms, the primary object of my invention being the provision of a device for recording the giving of signals upon a train, being primarily intended to record the sounding of the whistle upon a steam locomotive.

One of the main objects of my invention consists in the provision of a recorder of the above described character which will not only record the fact that the signal has been given, but will also record it in such a manner that the exact place at which the signal was given will be apparent.

More specifically, my invention comprises an attachment for a speed recorder for locomotives of standard type so arranged that the giving of the signals will be recorded upon the same chart upon which the speed record is made. Because of this, it will be possible to tell from a glance at the chart not only at what part of the trip any particular signal was given, but also the rate of speed at which the train was traveling when the signal was given and any changes in speed which may have been made at that time.

The speed recorder of the type to which my device is primarily adapted to be attached includes a chart movable at a speed proportionate to the speed of the train and having parallel horizontal rulings indicating varying speeds per hour, spaced series of vertically alined dashes, the series of which are spaced a distance indicating a mile, and spaced horizontal series of dots, the distance between adjacent dots in each series corresponding to the space between adjacent telegraph poles or other standard distances along the track. Co-acting with this chart is a pencil constantly held in engagement with the chart and movable upwardly from a position of rest when the locomotive is stationary to a height directly in proportion to the speed of the locomotive. Obviously, the curve plotted upon this chart by the pencil will be an accurate and exact record of the speed of the train through all parts of its trip.

One of the primary objects of my invention consists in the provision of a second pencil constantly engaging the upper portion of the chart and adapted for limited vertical movement and in the provision of means actuated by the giving of the type of signal which it is to record for causing such movement of the pencil.

In this connection, a still further object of my invention consists in the provision of a device adapted to be connected in the steam line leading to the whistle of the locomotive to receive steam from such line when the whistle is being sounded and adapted when subjected to pressure of steam to operate certain connections between it and the pencil to reciprocate the pencil.

It will of course be appreciated that the movement of the record chart is extremely slow in comparision to the movement of the train and that, as a result, if the pencil was to be reciprocated vertically each time the whistle was blown, a succession of short blasts upon the whistle would merely give as a record a single line upon the chart, one stroke of the pencil being superimposed upon another. For this reason, a still further object of my invention consists in the provision of means for slightly moving the pencil laterally between each record which it makes in order that each signal following another in rapid succession may be independently and clearly recorded.

With these and other objects in view, my invention will be more fully described, illustrated in the accompanying drawings, and then specifically pointed out in the claims which are attached to and form a part of this application.

In the drawings:

Figure 1 is a fragmentary side elevation of a locomotive, showing my invention applied thereto;

Fig. 2 is a fragmentary perspective view of a speed recorder for locomotives of a standard well known type, showing my invention applied;

Fig. 3 is a fragmentary top plan view, partially in section, of the mechanism shown in Fig. 2;

Fig. 4 is a fragmentary front elevation, partially in section, of the pencil supporting structure of my device, the operating lever being shown in dot and dash lines both in active and inactive position and the remainder of the pencil supporting mechanism being shown in full lines in normal position and in dotted lines in active position;

Fig. 5 is a vertical longitudinal sectional view through the pencil holder proper, showing the manner of mounting it, whereby it is automatically moved laterally between each record made by it;

Fig. 6 is a fragmentary sectional view, showing still further the manner of mounting the pencil;

Fig. 7 is a perspective view of the pencil and its supporting carriage or cross head removed from the remainder of the device;

Fig. 8 is a fragmentary plan view of a record chart, showing both the speed and signal records thereon;

Fig. 9 is an elevation, partially in section, of the steam operated means for actuating my recording attachment.

Corresponding and like parts are referred to in the following description and indicated in all the views of the drawings by the same reference characters.

That portion of my invention which cooperates directly with the speed recorder is best shown in Figs. 2 to 7 inclusive of the drawings and to insure a clear and accurate understanding of its construction and operation I will first briefly explain the main features of construction and operation of those portions of the recorder proper with which it co-acts. Referring particularly to Figs. 2 and 3 of the drawings, in which is illustrated a speed recorder for locomotives of the well known Boyer type, 10 indicates the housing or casing for the driving mechanism proper of the recorder and includes a top plate 11 and a base plate 12, the former supporting the record chart carrying rolls and cylinder and mechanism co-acting directly therewith. This recorder includes spaced vertical spindles 13 carrying mandrels about which the ends of the record chart 14 are wound and a relatively large vertically disposed friction cylinder 15 over which the chart passes, this cylinder being mounted for free revolution. Any suitable mechanism, not illustrated in the present instance, such as that disclosed in patents granted to Joseph Boyer, No. 356,916, dated February 1, 1887, and No. 470,468, dated March 8, 1892, is employed for driving the spindles 13 in the same direction and at a rate of speed proportionate to the speed at which the locomotive is traveling. It will, therefore, be seen that as the chart is unwound from one of its mandrels it is wound upon the other. Vertically disposed parallel standards 16 are revolubly mounted in the top and bottom walls of the casing and extend in parallel spaced relation to the periphery of the cylinder 15 and each is provided opposite the upper and lower portions of the cylinder with radially extending arms 17 which carry vertically disposed friction rollers 18 which taper somewhat from their central portions to their ends. These friction rollers are resiliently mounted in the arms 17 and may be swung into more or less close engagement with the portions of the chart bearing against the friction cylinder 15 by turning of their respective supporting standards 16. One of these standards is provided with a handle 19 by means of which it may be swung to bring its roller into and out of engagement with the chart and the lower ends of the standards are provided with radially extending arms 20 connected by a link 21 so arranged that the two standards will be swung simultaneously.

The upper ends of the standards are braced by an arcuate frame member 22 disposed at a level slightly above the top of the cylinder 15. This frame member also serves to brace a pair of vertically extending spaced guide rods 23 upon which is reciprocally mounted a cross head 24 carried by the upper end of a piston 25. The upper end of this piston is slotted to receive the intermediate portion of a yoke 26 and springs 27 are connected to the bottom of the casing and to this yoke to normally hold the piston and its cross head in lowered position. Means, not shown, including an oil pump, is provided for raising the piston and cross head against the action of the springs a distance proportionate to the speed at which the engine is traveling. This cross head supports an arm 28 which is spring pressed toward the periphery of the cylinder 15 and which carries a pencil holder 29 having a spring pressed pencil 30 which is held in constant engagement with a portion of the chart passing about the cylinder 15. This pencil, as shown, is radially disposed with respect to the cylinder in order to insure proper engagement with the chart.

The chart 14, as best shown in Fig. 8 of the drawings, is in the form of a strip of paper or other suitable material substantially equal in height to the height of the cylinder 15 and wound at its ends upon the mandrels carried by the spindles 13. This chart is provided with a series of equally spaced longitudinally extending rulings 31, the space between adjacent rulings indicating a certain variation in engine speed, such as a change of five miles an hour. Normally, the pencil 30, when the locomotive is at rest engages directly upon the lowermost of these rulings and as the speed of the engine increases, the pencil being raised by the piston 25 will pass upwardly over successive rulings to a height of course dependent upon the speed of the locomotive. The chart is further inscribed with a plurality of spaced vertical rulings 32, which are preferably in the form of broken lines, the space between adjacent vertical rulings corresponding to a certain standard distance along the track, such as a mile, the recorder being geared to a moving wheel of the locomotive in such a manner as to drive the chart a distance equal to the space between adjacent vertical rulings for each mile for which the locomotive travels. In addition to this, the chart is provided with a series of vertically spaced longitudinal dotted rulings 33, preferably disposed between the rulings 31, for the sake of convenience. Each dot in these rulings 33 corresponds to a telegraph pole along the track and the dots are, of course, spaced a distance proportionate to the distances between corresponding poles.

It will, of course, be clear that during operation of the locomotive, inasmuch as the chart is driven at a speed proportionate to the speed of the locomotive and inasmuch as the pencil is moved at right angles to the direction of the chart through a distance proportionate to the speed of the locomotive, a continuous record line will be inscribed upon the chart from which the speed of the locomotive at any desired point during its trip may be readily determined. A portion of such a speed record is shown at 34 in Fig. 8 in which the speed of the locomotive, for substantially four miles, is plotted. This record shows that the train, from the point A to the point B gradually increased in speed and that from this point B to the point C it was brought to a relatively rapid stop. My invention consists in providing means for making a second record upon the same chart of such a nature that it may be read in connection with this record in order that the chart may show not only whether the engineer operated the engine at the proper speed, under various circumstances, but also whether, under the same circumstances, he gave the appropriate signal or signals.

The above described structure and chart are of a well known standard type and any further description, either of their construction or operation, is believed to be unnecessary to an understanding of my present invention. The same guide rods 23 which support the cross head 24 with my construction also serve to support or guide a second cross head 35, preferably identical in construction to the cross head 24 and best illustrated in Fig. 7. This cross head is substantially rectangular in shape having its ends bifurcated to provide spaced ears 36 between which is rotatably mounted peripherally grooved rollers 37 which engage the adjacent faces of the rods 23. This cross head 35 is formed centrally with an opening and is slidably supported upon the unthreaded shank portion of a bolt 38 which is threaded through the brace 22 with its head disposed in spaced relation below the brace. It will be clear that the adjustment of this bolt in the brace 22 will vary the amount of movement permitted the cross head 35. A supporting standard 39 extends upwardly from the top 11 of the casing of the speedometer mechanism and has its upper end slotted to pivotally receive one end of an operating lever 40. A pivot bolt 41 is passed through this lever and threaded into the intermediate portion of the cross head 35 in order that swinging of the lever may cause corresponding vertical movement of the cross head. Spacer sleeves 42 preferably surround the pivot bolt 41 at either side of the lever 40 and the bolt receiving opening in the lever is, of course, of sufficient size with respect to the bolt to permit free swinging of the lever without causing binding between the cross head and its guide rods 23. A pin 43 extends rearwardly from the lever at a point between its connection with the cross head and its free end and serves as a point of attachment for one end of a helical spring 44, the opposite end of which is secured to the brace 22. This spring normally holds the lever and, consequently, the cross head 35 in raised position and serves to return it to such position when moved by depression of the lever.

As will be best seen by reference to Figs. 4 to 7 of the drawings, I provide an arm 45, one end of which is bifurcated to straddle the intermediate portion of the cross head 35, as shown at 46, the arm being pivoted to the cross head by a pin 47. A pencil holder, indicated as a whole by the numeral 48, is carried by the free end of this arm 45 and a leaf spring 49 co-acting between the crosshead and arm normally holds this pencil holder in juxtaposition to the chart and in vertical alinement with the pencil holder 29 of the speed recorder. This pencil holder successively includes a cylindrical body 50 reduced to provide stop shoulders 51 and 52 and formed in its unreduced end with a cylindrical socket 53 and in its reduced end with a central bore 54 communicating with the socket. A cap 55 closes the socketed end of the holder and is provided with an opening 56 in alinement with the bore 54. A clamping sleeve 57 is loosely mounted in the socket and formed at its inner end with a flange 58. The pencil 59, which is in the form of a slender brass rod, is frictionally engaged in the clamping sleeve and a helical spring 60 engaging between the flange 58 of the sleeve and the cap, serves to normally hold this pencil in extended position. That portion of the body of the holder, between its shoulders, passes through the non-centrally disposed bore of an eccentric sleeve 61 and through a washer 62 engaging against the end of the sleeve 61. A cup-shaped guard nut 63 is threaded upon the end of the body of the holder to protect the active end of the pencil and engages against the shoulder 52 and washer 62. The arm 45, supporting the pencil holder, is formed with an opening to rotatably receive the eccentric sleeve 61 and the sleeve is formed with a peripheral flange 64 in order that the arm may be retained between such flange and the washer 62, as best shown in Figs. 5 and 7 of the drawings. It will, therefore, be seen that any turning movement of the eccentric sleeve 61 in the arm 45, the pencil holder being fixed to turn with the sleeve, will cause a lateral movement of the pencil holder and its pencil. The eccentric sleeve, at its outer end, is formed with a ratchet wheel 65 and a resilient pawl 66 carried by the standard 39 engages the teeth of this ratchet wheel in such a manner that during downward movement of the carriage and its pencil holder, the pawl will cause a partial turning of the eccentric sleeve 61 and a lateral movement of the pencil. It will, therefore, be apparent that no matter how slowly the chart may be moving or how rapidly the pencil may be successively moved up and down, the pencil will never engage the chart at the same place and no two records made by the pencil can possibly be superimposed one upon the other.

Obviously, any one of many different means may be employed for causing swinging of the lever 40 when a signal which is to be recorded is given, some means being better adapted for recording certain signals, such as signals electrically given, while others are better adapted to record signals in the nature of whistles operated by steam or compressed air. For instance, in recording electrically operated signals, a solenoid or other equivalent electrical device may be operatively connected to the lever and included in the signaling circuit. However, my signal recording attachment for speed recorders is primarily intended for use upon steam driven locomotives to record signals given by the whistles of such locomotives and for that reason I have illustrated and will describe a mechanism operated by steam for swinging the lever 40.

For an understanding of such a mechanism, attention is particularly directed to Figs. 1 and 9 of the drawings. In Fig. 1 I have shown the combined speed and signal recorder supported in a conventional and well known manner, as shown at 67, its drive shaft 68 being connected to one of the locomotive axles by any suitable means as by a drive belt 69. In this figure I have also illustrated a conventional form of steam whistle 70 to which steam may be admitted by opening a valve by pulling a signal cord 71, the free end of which extends into the engineer's cab. As best shown in Fig. 9, the admission of steam to the whistle is controlled by a valve 72 having an outlet chamber 73 communicating with the whistle proper. I provide a cylinder 74 having a laterally directed nipple 75 formed at one end with a reduced threaded terminal 76 which is threaded through the wall of the outlet chamber 73 of the valve, the nipple being formed with a passage 77 through which steam will pass to the cylinder proper when the valve 72 is opened, as well as the whistle. Reciprocally mounted in the cylinder 74 is a piston 78 having a piston rod 79 extending through both ends of the cylinder. A spring 80, surrounding the piston rod, engages at one end against the piston and at the other end against an inner guide cap 81 seating in the open end of the cylinder and held in place by an outer cap 82 through which the piston rod extends. This spring normally holds the piston at the inner end of the cylinder 74 but permits movement of the piston into engagement with the guard cap 81 when steam is admitted to the cylinder. That end of the piston rod extending through the closed end of the cylinder is provided with an eye 83 to receive one end of a wire 84 or other suitable flexible connection and this wire is led through a tubular conduit 85 into the exterior casing of the recorder 67. Within this recorder, the wire passes beneath and about a peripherally grooved idler pulley 86 rotatably mounted in the bifurcated upper end of a supporting standard 87 carried by the top 11 of the casing and is connected by a hook 88 or other suitable device to the free end of the lever 40.

From the foregoing description, it will be clear that as soon as the steam is admitted to the whistle by opening of the valve 72 it is also admitted to the cylinder 74, causing movement of the piston rod 79 and consequent downward swinging of the free end of the lever 40 through the wire connection between the piston rod and lever. As soon as the valve 72 is shut, further supply of steam to the cylinder will be shut off and what steam there is in the cylinder will escape through the whistle, permitting the spring 80 to return the piston rod to normal position and the spring 44 to return the lever and cross head 45 and pencil carried thereby to normal position.

The advantages of a recording attachment of this character and its manner of operation will be readily understood from the foregoing description, when taken in connection with the drawings. Whenever a signal is given, the cross head 35 will be lowered, causing the pencil 59 to make a substantially vertical record line upon the chart, thereby recording the giving of a signal at that particular point along the route of the locomotive. Furthermore, inasmuch as the pencil 59 is, consequently, in engagement with the chart, it will be clear that the length of the horizontal line connecting the lower ends of the lines representing the beginning of the giving of a signal and the termination of a signal when taken in connection with the rulings of the chart will indicate whether the signal given was of long or short duration. The number of successive record lines will indicate the number of successive signals given and the length of the lines connecting the upper ends of the record lines will indicate the time which elapsed, considering the rate of speed of the locomotive as also recorded upon the chart, between successive signals. In Fig. 8, a portion of a signal record is shown at 89. As there shown, the engineer caused the whistle to give two long signal blasts in rapid succession, indicated at D followed immediately by two short blasts, indicated at E. Upon the same portion of the chart, the speed recorder proper shows that the engineer, at substantially the same time which he gave these signals, made a rapid reduction in train speed. The value of a recording device of this nature in the way of fixing the responsibility upon the proper parties, in cases of accident, will be readily appreciated.

It will of course be understood that I do not wish to limit myself to the application of my signal recording mechanism to a speed recorder of the type illustrated as it may be applied to any type of speed recorder having a movable chart as, with the exception of the chart, my recording device is entirely independent in its action and operation of the remainder of the speed recorder. I therefore reserve the right to make any changes within the scope of the appended claims which may be found necessary or advisable in adapting my invention to use under varying circumstances.

Having thus described the invention, what is claimed as new is:

1. The combination with a signal and a speed recorder for locomotives including a chart driven at a speed proportionate to the speed of the locomotive, of a recording element constantly held in engagement with the chart, means operable upon the giving of a signal for causing movement of the recording element at an angle to the line of movement of the chart, said means also operating to move the recording element laterally.

2. The combination with a signal and a speed recorder including a chart driven at a speed proportionate to the speed of the vehicle carrying the recorder and signal, of a carriage mounted for limited movement at right angles to the path of movement of the chart, means operable upon the giving of a signal for causing movement of the carriage in one direction and upon completion of a signal for returning the carriage to normal position, an arm carried by the carriage, and a recording pencil supported by the arm and constantly in engagement with the chart, the connection between the pencil and arm being such as to cause slight lateral movement of the pencil upon movement of the carriage and arm through giving of a signal.

3. In a signal recorder, the combination with a signal and a speed recorder including a chart driven at a speed proportionate to the speed of the vehicle, of a carriage having limited movement at an angle to the path of movement of the chart and adapted to be reciprocated by the giving of a signal, an arm carried by the carriage, a sleeve rotatably supported in the arm, a ratchet formed upon the sleeve, a pawl engaging the ratchet to cause turning of the sleeve upon reciprocation of the carriage, and a recording element eccentrically supported by the sleeve and constantly engaging the chart.

4. In a recorder, a movable support, a holder rotatably mounted in the support, a recording element eccentrically supported in the holder, and means operable upon movement of the support for causing turning of the holder.

5. The combination with a speed recorder including a chart adapted to be driven at a speed proportionate to the speed of the vehicle, of a signal, a carriage mounted for movement adjacent the chart and adapted to be moved upon operation of the signal, a recording element supported for turning movement by the carriage to turn eccentrically with respect to its axis, and means for causing turning movement of the recording element upon movement of the carriage.

In testimony whereof, I affix my signature.

EDWIN F. MILLER. [L. S.]

Copies of this patent may be obtained for five cents each, by addressing the "Commissioner of Patents, Washington, D. C."